United States Patent [19]

Brown

[11] Patent Number: 4,965,765
[45] Date of Patent: Oct. 23, 1990

[54] DISTINGUISHING NESTED STRUCTURES BY COLOR

[75] Inventor: Max R. Brown, Arlington, Tex.

[73] Assignee: International Business Machines Corp., Armonk, N.Y.

[21] Appl. No.: 864,175

[22] Filed: May 16, 1986

[51] Int. Cl.$^5$ .............................................. G06F 3/153
[52] U.S. Cl. .............................. 364/900; 364/927.3; 364/947.5; 364/977; 364/521
[58] Field of Search ... 364/200 MS File, 900 MS File, 364/518, 521; 340/701, 721

[56] References Cited

U.S. PATENT DOCUMENTS 3,909,797  9/1975  Goss et al. .................... 364/200

FOREIGN PATENT DOCUMENTS 0103317  3/1984  European Pat. Off. .
57-189239 11/1982  Japan .

Primary Examiner—Thomas C. Lee
Attorney, Agent, or Firm—Whitham & Marhoefer

[57] ABSTRACT

A method of distinguishing between nested expressions, functions, logic segments or other text by using a different color for each nesting level.

3 Claims, 2 Drawing Sheets

FIG. 2

```
2190 Function Key 10 - Execute Stored instructions
2200 FOR LC = 1 TO MXLN : FOR CC = 1 TO 5
2210 IF LNCMD ( LC,CC,1 ) = 0 THEN GOTO 2600   No operation in this entry
2230 EXNDX = LNCMD ( LC,CC,1 )   Pick up operation color
2240 IF EXNDX 6 THEN GOTO 2600   If invalid color, skip this operation
2250 Branch on color to perform requested function
2260 ON EXNDX GOTO 2300,2400,2600,2270,2600,2600
          •
          •
          •
2410 NXLIN=LC:GOSUB 3520:COLOR TXHUE,0
2415 FOR TMCOL=LNCMD ( LC,CC,3 ) TO LNCMD ( LC,CC,3 ) +LNCMD ( LC,CC,4 ) -1
2418 IF TMCOL 80 THEN GOTO 2435   Skip print if past edge of display
2420 TMCHR$=CHR$ ( SCREEN ( NXROW,TMCOL )) : IF TMCHR$="" THEN GOTO 2435
2425 IF TMCHR$=CHR$ ( 4 ) THEN TMCHR$=" "
2430 LOCATE NXROW,TMCOL,1:PRINT TMCHR$
2435 NEXT
          •
          •
          •
2595 End of loops to find and execute color operations
2600 NEXT
2610 NEXT   Finish loop for color operations
2615 TXLN=FLOIS ( ROW ) : GOTO 830   Reste file line index, and exit
3180 Subroutine to Find Target and Move Text String to It
3195 Extract text string to be moved
3200 MVBUF$=MID$ ( FILTX$ ( LC ) ,LNCMD ( LC,CC,3 ) , LNCMD ( LC,CC,4 ))
3205 MARK=LNCMD ( LC,CC,2 ) :GOSUB 3450   Find target location for move
3215 Get length of text preceding target-Adjust if mark is on left
3220 NDX1=LNCMD ( MKL,MKC,3 ) : IF LNCMD ( MKL,MKC,1 ) = 17 THEN NDX1=NDX1-1
3225 TXBUF$=LEFT$ ( FILTX$ ( MKL ) ,NDX1 )   Get line segment preceding target
          •
          •
          •
```

| YELLOW 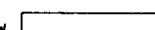 | RED 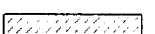 | MAGENTA  |
| BLUE 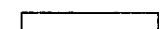 | GREEN 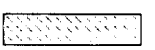 | CYAN  |
| BROWN  | | |

DISTINGUISHING NESTED STRUCTURES BY COLOR

BACKGROUND OF THE INVENTION

This invention relates to the analysis and differentiation of multiple levels of nested expressions, procedures, statements and other structures of information, particularly in programming languages.

BRIEF DESCRIPTION OF THE INVENTION

The analysis of multiple levels of nested computing expressions, procedures, statements and other structures of information in programming languages is a basic function in compilers and interpreters. Nesting, in data processing, is the incorporation of some kind of structure into another structure, often of the same kind; e.g., nesting one loop or subroutine (the nested loop or subroutine) within another loop (the nesting loop or subroutine). Nesting also includes embedding subroutines or data in other subroutines or data at a different hierarchical level, so that different levels of information may be executed or accessed as interruptions in the execution of higher levels of information.

At the present time, the usual way to differentiate among nested structures is by the use of delimiters, such as operators, characters, vocabulary words, indentations, and so forth, which indicate the beginning and end of each nested structure. In practice it is very difficult for anyone to read and comprehend different nesting levels quickly. This is a particular problem for programs containing numerous nesting levels or where the components of a nested structure are scattered. In such cases the structure cannot easily be gleaned from the surrounding material and it is difficult to discern the relationship among the levels.

As a practical example, assume that a programmer or designer is studying the text of a computer program. During the examination of any given level of logic, one or more nested sub-levels of logic may be encountered. Whenever this occurs, the study of the immediate logic level cannot be completed until the function of the nested level is understood. The nested level in its turn may also contain nested levels. The programmer or designer must remember enough information about each level of logic to permit a resumption of the examination of that level when evaluation of each piece of nested logic encountered is complete.

As a further complication, the extent and type of examination performed by the designer for each nest and level of logic depends upon the purpose for which the information is needed. For program language translation and compilation, it differs for various languages, as do the characters and syntax formats which delimit the nested structures.

SUMMARY OF THE INVENTION

It is therefore an object of my invention to make the analysis of nested structures of information faster and easier.

It is a further object of my invention to provide a uniform means to display boundaries between structures for examination, irrespective of the programming language being used.

I have found that the use of color provides a fast, easy-to-use means for distinguishing nesting levels. I have developed a method for formatting text, typically computer programs, in color as the text is moved from one storage area, e.g., a file storage, to another storage area, typically a display area in a data processing system. Different colors are specified for the different nesting levels. (Different intensities and shades of the same color are also included within the term "different colors".)

My preferred method includes an analysis program (analyzer) to perform the nesting evaluation which is activated and terminated by commands specified by the user. The analyzer is tailored to the particular program language so as to recognize the appropriate delimiters. (The particular language of the program being analyzed may be specified by a command to a generalized analyzer.) The analyzer reads the program which is to be examined by the programmer. Nesting analysis is done for each statement (or set of statements) in the text as it is prepared for display. An initial color for the display of the beginning statement or portion of a statement (the highest level of logic in the text being analyzed) is selected from a list of those available for display, and a scan of the text is begun.

As each new level of logic is found, a code for the color used to display the current logic level is saved by the analyzer as the latest entry in a first-in/last-out table (stack) arrangement. Under this arrangement, the latest color code is placed above other earlier entries for any higher levels of logic encountered earlier in the immediate statement or set of statements. This table represents a list of incomplete logic levels. Any text for a level being suspended (not yet complete) which has not yet been moved to the display area is placed there now, in the appropriate color for that level. Next, the starting syntax just recognized for the new logic level is also placed in the display area in the same color as the level being suspended. Then, the next color from the list of those available is selected, and the analysis process begins again with the new, lower logic level.

Whenever the ending syntax, i.e., the delimiter representing the end of a nest, is found, any text for the logic level just completed which has not yet been moved to the display area is placed there in the appropriate color for that logic level. The color to be used for the display of the delimiter and the text following that delimiter is then taken from the previous, lower entry in the first-in/last-out table of incomplete logic levels. This color represents the next higher level of logic, now being resumed. Any information necessary to continue the scan of that logic level is also taken from the table entry; and the entry is then removed from the list. The scan of the higher logic level may then be continued.

BRIEF DESCRIPTION OF THE DRAWING

The foregoing and other objects, advantages and aspects of my invention will be better understood from the following detailed description of the invention with reference to the drawing in which:

FIG. 2 is a computer program listing which illustrates nested expressions having different colors.

DESCRIPTION OF THE PREFERRED EMBODIMENT

Figure 1:
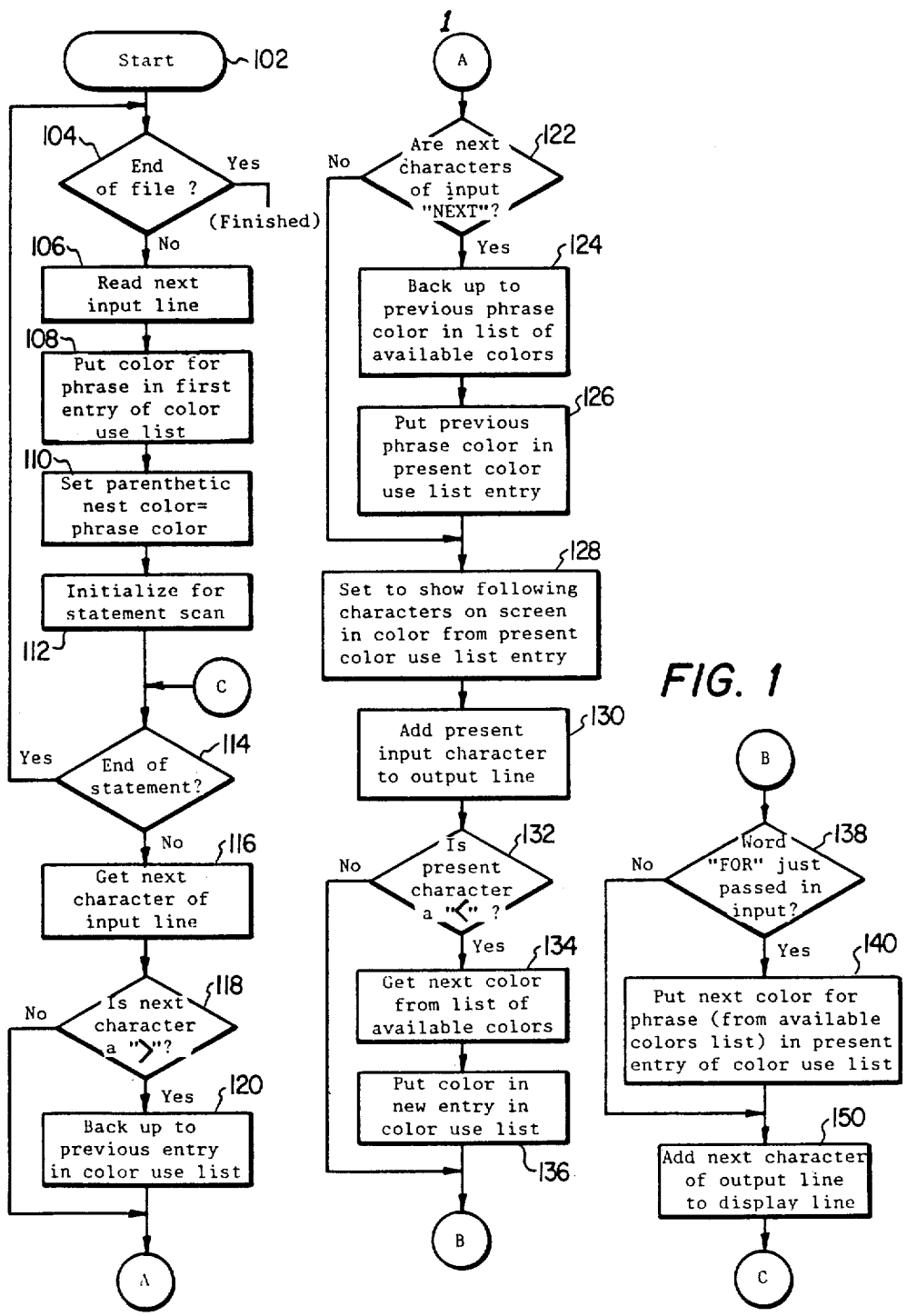
FIG. 1 is a flow diagram of the method to distinguish nested expressions with different colors.

Each input statement of the text of computer program source code is scanned for parenthetical nests, each level of which within the statement is displayed by a separate color. In addition, in the present example input statements are scanned for segments of code delimited by the FOR . . . NEXT word pair. In my preferred embodiment, the statements or phrases within such a segment are shown in a color different from that used outside the segment. Other code segments defined by other delimiting word or symbol pairs could be highlighted in the same way. For example, other combinations such as IF . . . THEN, BEGIN . . . END, etc.

Color codes to control the display of the text in different colors are defined in a fixed array, termed COL. A Basic Color index, termed BCDX, is used to indicate the color currently in use for the phrases at the parenthetic nest level zero. Index BCDX also is used for text with no nesting and any levels of FOR-NEXT nesting.

The index BCDX is stepped up and down the array COL in accordance with the finding of FOR and NEXT words. Each time the BCDX index is stepped, the newly identified color code is sent to the display, which sets the color of the following text.

The color codes used to highlight parenthetic nests are taken from the same fixed array, COL, starting with the next color after the one being used for the material at parenthetic level zero. The colors for parenthetic nesting are placed in a second array, termed UCOL, which is indexed by a second index, termed UCDX. This second array is the last-in, first-out stack previously referred to; and it may be viewed as a color use list. The second index UCDX is also stepped up and down the second array UCOL as each left and right parenthesis is found. As with the first index, each time the UCDX index is stepped, the color code just indicated is sent to the display which sets the color of the text following the parenthesis.

As noted, the colors in the array COL are constant, and in my preferred embodiment the same colors are always used to identify the same levels of FOR-NEXT nesting. However, the colors in the UCOL array indexed by UCDX, used to identify parenthetic nests, will vary as such nests are closed and new ones opened. For the purpose of clarity in analyzing a program which has been color coded, in my preferred embodiment, I have chosen to insure that no two parenthetic nests in a single statement (line of code) will have the same color. To do this, the color for each parenthetic nest is removed from the UCOL array when the nest is closed. This color will not be used for another nest in the same statement unless all of the available colors are exhausted, and the analyzer program starts through the fixed color list, COL, a second time. Thus, in my preferred embodiment, no two nests of any kind (parenthetic, FOR-NEXT, or any other type of structure) within a program statement or first-level structure share the same color.

TABLE I

| COL(1) = 14 | Yellow |
| COL(2) = 9 | Light Blue |
| COL(3) = 6 | Brown |
| COL(4) = 12 | Light Red |
| COL(5) = 2 | Green |
| COL(6) = 13 | Light Magenta |
| COL(7) = 3 | Cyan |
| COL(8) = 10 | Light Green |
| COL(9) = 5 | Magenta |
| COL(10) = 11 | Light Cyan |
| COL(11) = 15 | High-Intensity White |

Table I lists the color codes as they appear in the first (fixed sequence) color table COL, representing the colors used in my analyzer to highlight different levels of nested logic. The codes are those used in the BASIC COLOR command to change the color of the text to be displayed.

The program which is the best mode for implementing the method to distinguish nested expressions with different colors is illustrated in the flow diagram shown in FIG. 1.

Turning now to FIG. 1, the usual flow diagram conventions are followed. Specifically, a diamond-shaped block represents a logical operation, such as a test or compare function, a rectangular block represents a step in a sequence step, such as initialize, load, save and the like, and a circle represents the entry into or the return to another part of the figure.

At the beginning of the analysis program, the file of the text to be listed is opened and the color index for statement/phrase nests is initialized (BCDX=1). The analysis program then begins at block 102; and the first operation determines in decision block 104 whether the program has reached the end of the text file. If the answer is yes, the analysis program is finished and the file is closed. If the answer is no, the next input line of text is read at block 106.

Index BCDX starts from the color of the statement/phrase; and index UCDX for the stack of colors in use in UCOL is initialized (UCDX=1). In my example, at the beginning of text being analyzed, the first color selected would be yellow because that is the first color shown in Table I. In this way the program selects a predetermined color and puts the color for the phrase in the first entry of the color use array, UCOL, as shown in block 108. As shown in block 110 the parenthetic nest color is set equal to the present color of the phrase. At this point the initial screen display location for this input line is set, and a scan of the input line from the beginning to the end of the statement is initialized, block 112. The program determines in decision block 114 whether the end of the statement has been reached. If the answer is yes, the program returns to decision block 104 where the process is repeated for the next line. If the answer is no, the next character of the input line is obtained as shown in block 116. This character is analyzed to determine whether it begins or ends a level of logic (i.e., whether a nest delimiter character or word has been found) or whether it does not affect the analysis.

The first step in the analysis is to determine the presence of the end of a nest. Initially, the program decides whether this next character is an end of parenthesis ")", as shown in decision block 118. If the answer is yes, the color use index, UCDX, is dropped to the previous stack entry, i.e., if UCDX > 1, then UCDX = UCDX − 1;

and the previous color is used for that character in the input line. If the answer is no, the program proceeds to A and a decision is made as to whether the next characters of the input are "NEXT" in the decision block 122.

If the character string "NEXT" is found, the end of a segment of program code which is delimited by the work pair "FOR . . . NEXT" has been reached. Index BCDX is then decremented by one; and the program backs up to the previous phrase color in the list of available colors, COL, as shown in block 124. It then puts the color of the previous phrase in the present color use array, UCOL, as shown in block 126.

If the answer in decision block 122 is no, the program proceeds to block 128 where it prepares to shown the following characters on the screen in the color selected from the present color use array. The present input character is then added to the output line as shown in block 130.

A decision is then made in decision block 132 as to whether the present character is a beginning parenthesis ")". If the answer is yes, the program obtains the next color from the available list of colors in COL as shown in block 134, and puts that color into a new entry in the color use list UCOL as shown in block 136.

If the answer in decision block 132 is no, the program proceeds to B where a decision is made in decision block 138 whether the character string "FOR" is the next input. If the answer is yes, the program puts the next color for the phrase (from the available colors list in COL) in the present entry of the color use list, COL, as shown in block 140. If the answer in decision block 138 is no, the program skips this step and proceeds to block 150 where the next character of the output line is added to the display line. The program then proceeds to C where a test is again made in decision block 114 as to whether the end of the statement has been reached.

FIG. 2 illustrates portions of the text of a computer program which has been color-coded in accordance with my invention. Each line of text has been analyzed in accordance with my invention, and the text is displayed in selected colors which are identified in the legend in the lowest part of the Figure. The identifiers of the different colors in the legend have been chosen so as not to obscure the program text, which would have been the case if standard hatchings had been used. Also, for the purpose of clarity and to avoid unnecessary identification, the numbers of the lines of program have not been coded although, typically, the line numbers would appear in appropriate colors.

The text is coded in accordance with the sequence of colors shown in Table I (COL). Thus, line 2190 is displayed in the color yellow (BCDX=1). In line 2200 a first logic level delimiter FOR appears in yellow and the subsequent text is coded blue, the second color in Table I. Also in line 2200, a second logic level FOR delimiter appears, which is also coded blue. However, the following text within the second FOR . . . NEXT loop is color-coded brown, the third color in Table I. The (last-in, first-out) color use list, UCOL, now contains the sequence: brown, blue, yellow (where yellow was the first entry, and brown the latest), indicative of two incomplete logic levels. On line 2200 the first parenthetic nest appears, with the parentheses retaining the color brown, but the text structure within the parentheses changing to the color red, which is the fourth color in the COL table. Similar color coding is done for the parenthetical expression on line 2230.

Line 2415 contains the first delimiter of the third level FOR . . . NEXT loop as well as three parenthetical nests, all of which are on the same level (second level). It will be noted that the text in each of these parenthetical nests is in a different color, the first in line 2415 being green, the second being magenta and the third being cyan. As noted previously, the reason for this is that I have chosen to ensure that the nested structures within different parenthetical nests in the same programming statement (line of code) have different colors. As an alternative I could have chosen to encode all of the nested text the same color, for example, green.

Line 2435 represents the end of the third level FOR . . . NEXT loop, and the delimiter has the same color as its companion on line 2415. Similarly, the NEXT delimiters on lines 2600 and 2610 have corresponding colors to their companions on line 2200, respectively.

Line 2615 continues the program being illustrated with no FOR . . . NEXT loop in effect; and the color of the text therefore is yellow, with the parenthetical expression on line 2615 being coded blue, the second color in Table I. Line 3200 presents a good illustration of the invention because the line contains two separate levels of parenthetical nests, a single first level nest and three second level nests. The parentheses of the first level nest are coded in yellow, the same as the preceding text, while the text within the parentheses, including all second level parenthetical delimiters, is coded blue. The text in the first, second and third second-level parenthetical expressions, respectively, is coded brown, red, and green. The text structures within each of the second level parenthetical nests are coded in different colors because I have chosen, as noted, to use a rule that no text within a parenthetical expression in one line will have the same color as the text in another parenthetical expression on the same line. However, if these same parenthetical expressions had been on different lines, the text within each parenthetical nest would have had the same color.

In the preferred embodiment of my program, when a nested structure is recognized, the analyzer program assigns a different color to the structure but retains the previous color for the delimiters. However, it should be understood that the alternatives of either assigning a different color to the delimiters but not to the structure within the delimiters, or assigning a different color to both the delimiters as well as the structure therewithin are in the scope of my invention.

Although the present invention has been described in the context of my preferred embodiment, it will be readily apparent to those skilled in the programming art that modifications and variations can be made therein without departing from the scope of the invention as defined in the claims.

I claim:

1. In a computer system for analyzing the logic of multiple levels of nested computing expressions, procedures, statements and other structures of information in programming languages, said computer system having color display means for displaying text of a computer program in a programming language, the method of performing a nesting analysis of the computer program as each statement of the program is prepared for display on said display means comprising the steps of:

storing in said computer system a color table of color codes in a fixed sequence;

displaying the text of a first level in a color corresponding to the first code in said color table;

as each new level of logic is found in said computer program, saving in said computer system a color code used to display a current level in a first-in/last-out table, this table representing a list of incomplete logic levels;

suspending the display of text in the color of said current level and commencing the display of text in a color according to said fixed sequence until a new level of logic or the end of the current level of logic is found; and resuming the display of text in the color of the previous, lower entry code in said first-in/last-out table when the end of the current level of logic is found.

2. The method of performing a nesting analysis of the computer program as recited in claim 1 further comprising the steps of:

storing in said computer system a list of delimiters according to said programming language; and testing the text in said program to detect a character string match between the text in said program and a delimiter stored in said list, a match indicating the beginning of a new level of logic or the end of current level of logic in said computer program.

3. The method of performing a nesting analysis of the computer program as recited in claim 2 wherein the character string of said delimiters are displayed in the color of the text outside the text of the nested structure.

* * * * *